United States Patent
Madden et al.

[15] 3,646,459
[45] Feb. 29, 1972

[54] INDUCED POLARIZATION RECEIVER

[72] Inventors: Theodore R. Madden, Weston; George H. Hopkins, Jr., Boston; Michael Chessman, Watertown, all of Mass.

[73] Assignee: Ampex Corporation, San Mateo, Calif.

[22] Filed: Feb. 26, 1971

[21] Appl. No.: 119,412

Related U.S. Application Data

[63] Continuation of Ser. No. 810,067, Jan. 27, 1969.

[52] U.S. Cl. ................329/50, 328/133, 329/122, 331/23
[51] Int. Cl. ................H03d 3/18
[58] Field of Search ................329/50, 122; 331/23, 25, 29; 328/133, 134; 178/5.4 SD; 325/329, 330

[56] References Cited

UNITED STATES PATENTS

| | | | |
|---|---|---|---|
| 2,979,611 | 4/1961 | Halina | 329/50 UX |
| 3,035,230 | 5/1962 | Jones | 329/50 |
| 3,109,143 | 10/1963 | Gluth | 329/50 X |
| 3,122,704 | 2/1964 | Jones | 329/50 X |
| 3,265,980 | 8/1966 | Thompson | 329/50 X |
| 3,287,657 | 11/1966 | Widl | 331/25 X |
| 3,069,505 | 12/1962 | Collins et al. | 329/50 X |
| 3,291,902 | 12/1966 | Dome | 329/50 X |

OTHER PUBLICATIONS

Terman, Radio Engineer's Handbook— 1943 McGraw & Hill Co. p. 654– 656 TK 6550 T42.

*Primary Examiner*—Alfred L. Brody
*Attorney*—Robert G. Clay and Hofgren, Wegner, Allen, Stellman & McCord

[57] ABSTRACT

A receiver for measuring the subsurface electrical impedance of the earth as indicated by the frequency dependent attenuation of low-frequency transmitted signals. The receiver has a gain control for establishing a reference gain level at one frequency and an indicator for the signal amplitude deviation at a second frequency. A synchronous detector controlled by the output of a local oscillator synchronized with the received signal permits operation under poor signal-to-noise conditions.

7 Claims, 5 Drawing Figures

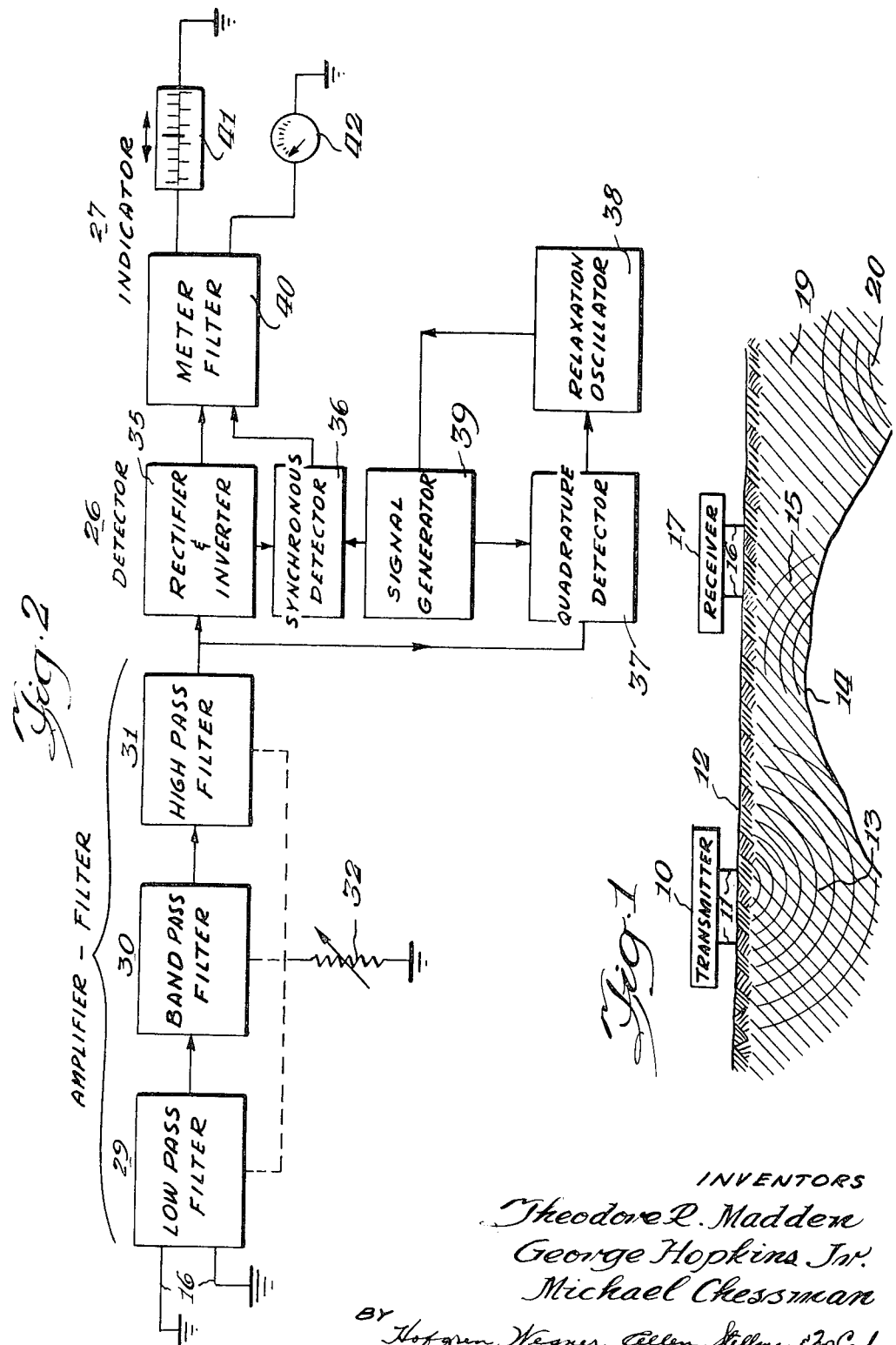

LOGIC STATEMENTS
TRIGGER IN-PHASE FF: $T_c = C\phi q + C\bar\phi\bar q$
TRIGGER QUADRATURE: $T_q = C\phi\bar q + C\bar\phi q$
$C$ = CLOCK PULSE $+V \rightarrow$ LOGICAL 1
$0V \rightarrow$ LOGICAL 0 IN $\phi$

INDUCED POLARIZATION RECEIVER

This is a continuation of application Ser. No. 810,067, filed Jan. 27, 1969.

Certain aspects of geologic investigation make use of the phenomenon of induced polarization in which electrical currents are applied to the ground, inducing an electrical surface polarization in certain metallic and other deposits. The polarization currents are measured, providing data which aids in determining the presence and extent of the deposits. One method of measuring involves the transmission through the ground of signals at two low frequencies, as 0.3 and 3 cycles per second. The signals are received at a point spaced some distance from the transmitter and the amplitudes of the received signals are compared. The signal ratio is a measure of the change of subsurface electrical impedance with frequency and an indication of certain types of mineral deposits.

This invention is concerned with a receiver for electromagnetic waves, useful in such an investigation. Briefly, the receiver includes a bandpass amplifier, a detector and a display. One feature of the invention is that the receiver includes a gain control which is adjustable during reception of a signal of one frequency to establish a reference gain level, and a signal amplitude indicator which is operable during reception of a signal at a second frequency to indicate, directly in percentage, the difference in the amplitudes of the two received signals.

Another feature of the invention is that the receiver has a plurality of AC-coupled serially connected amplifying and filtering stages which are arranged in the sequence of low-pass, bandpass and high pass, to obtain a maximum signal-to-noise ratio. Furthermore, the amplifier gains are so related that the amplifiers saturate in sequence from output to input, with an increase in signal strength. The gain of the first amplifier contributes to signal gain with minimum noise introduction. The receiver has a high impedance, AC-coupled input, which renders its operation relatively unaffected by variation in electrode-ground contact resistance and entirely unaffected by electrode-ground contact potential.

As intimated in the preceding paragraph, noise is a major problem in the measurement of induced polarization. Several kinds of noise are frequently encountered. They include earth currents resulting from fluctuations of the earth's magnetic field, which at higher frequencies merge with interference from thunderstorms. Man made interference may be caused by electrical equipment in nearby mines and, in urban areas, from transients on power lines and the like.

Still another feature of the invention is the provision of a full wave phaselocked synchronous detector circuit which greatly reduces noise interference. The receiver includes a local oscillator locked in phase with the received signal which in turn generates signals which control the operation of the synchronous detector.

Further features and advantages of the invention will readily be apparent from the following specification and from the drawings, in which:

FIG. 1 is a diagrammatic illustration of a transmitter and receiver used in induced polarization impedance measurements;

FIG. 2 is a block diagram of the receiver;

Figure 3:
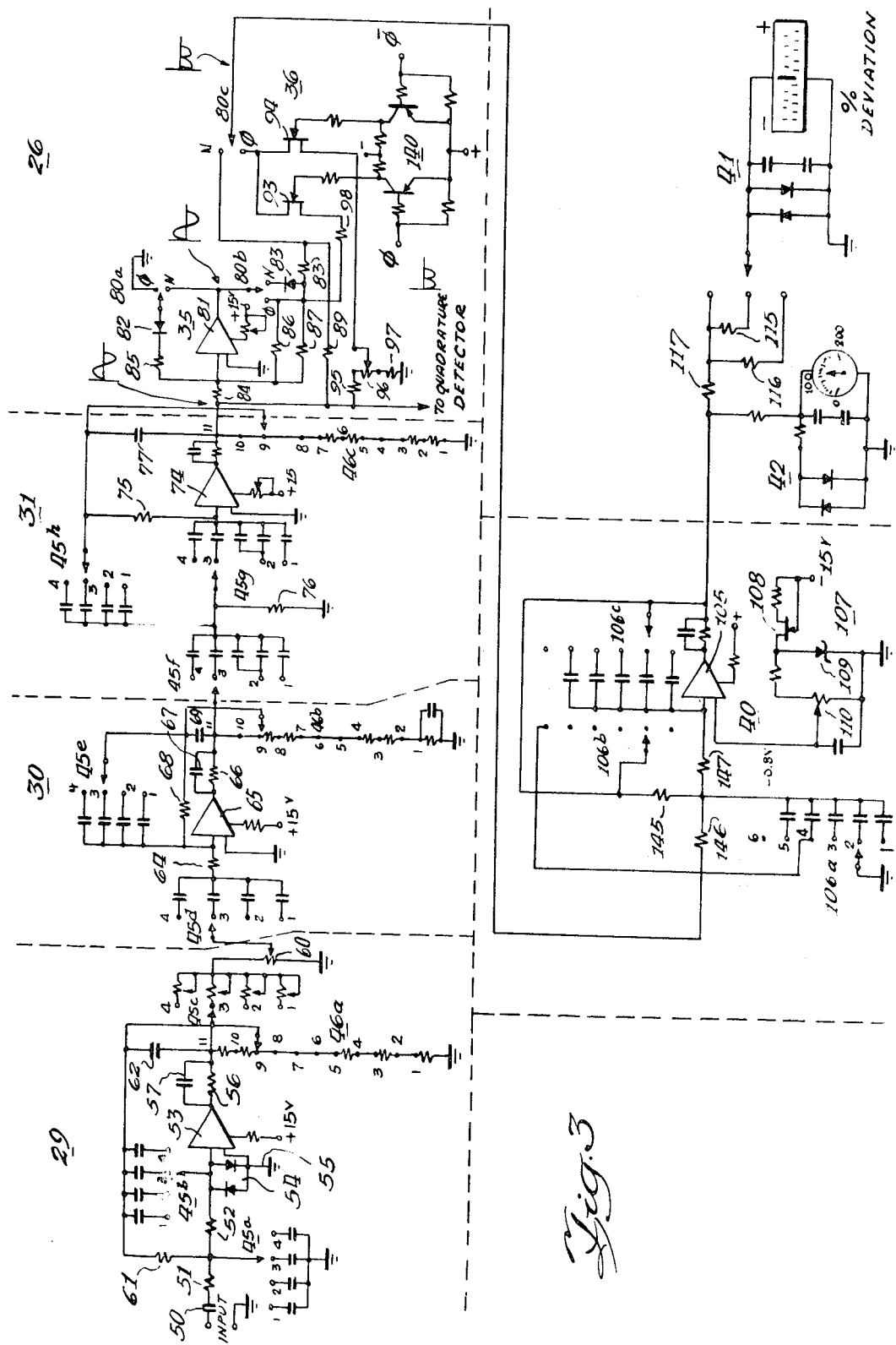
FIG. 3 is a schematic diagram of the bandpass amplifier, detector and indicator circuitry.

This application does not include a theoretical discussion of the physical characteristics which give rise to the induced polarization phenomenon, or of the interpretation of survey results. Further information concerning these aspects of induced polarization surveying can be found in:

1. Marshall, D. J., and Madden, T. D., Induced polarization: a study of its causes, 1959, Geophysics, 24, 790–816;
2. Keller G. Keller, and Frischknecht, F. C., Electrical methods in geophysical prospecting (International series of monographs in electromagnetic waves volume 10) 1966, Pergamon Press Inc., 517 pgs.

During the course of the following specification, and in a table at the end thereof, are descriptions of portions of the circuitry of the receiver including information concerning component types and values. It is to be understood that this detailed information is given for the purpose of making a complete disclosure of a preferred embodiment of the invention. The various components are not to be considered critical unless otherwise indicated.

In FIG. 1 of the drawings, a square wave transmitter 10 is shown having its output connected at 11 with the surface of the ground 12. The transmitted electromagnetic waves illustrated diagrammatically at 13 pass through the ground and induce polarization in certain subsurface formations 14. The attenuated signal 15 from transmitter 10, and is coupled through electrodes 16 to receiver 17. Interfering signals 20 (as from operations in a mine or currents induced in the earth from other sources) reach the receiver 17 from below. Interference signals 19 may be caused by activities above the ground, as transients on a power line.

The receiver is illustrated in block form in FIG. 2 where the electrodes 16 are connected with an amplifier-filter 25. The output of the amplifier-filter is connected with the detector 26, the output of which is in turn connected with an output signal indicator 27. The amplifier-filter 25 has three stages, 29, 30 and 31, each of which includes an amplifying element and frequency selective circuitry forming a portion of the filter. A gain control 32 acts on each of the stages, as indicated by the broken lines, and controls the overall gain of the receiver. Each of the amplifying stages 29, 30 and 31 includes provision for frequency switching, as will appear, so that the proper pass band characteristics may be established for each signal frequency used.

Detector 26 includes a full wave rectifier 35 which is utilized when the signal-to-noise ratio is sufficient to provide a discernible signal. Under poor noise conditions, a synchronous detector 36 is utilized and in this operating condition the rectifier 35 serves as a signal inverter to provide an input for the synchronous detector. The received signal is also coupled to a quadrature detector circuit 37 which in turn controls the operation of an oscillator 38, the output of which is connected to a signal generator 39 having an in-phase output controlling the synchronous detector 36 and a quadrature output connected with quadrature detector 37.

The detected signal, either from rectifier 35 or from synchronous detector 36, is connected with filter circuit 40 of indicator 27. The output of the filter, which is essentially a DC potential, with an amplitude directly related to the amplitude of the received signal, is connected with meters 41 and 42. Although the meters respond to the same signal, they have different sensitivities and are utilized in different manners to indicate different information concerning the received signals.

In operation a sequence of readings is taken in the following manner. A signal at a first frequency is generated by transmitter 10 and is utilized for calibration of the receiver. Gain control 32 is adjusted to establish a reference gain level for the receiver, as indicated by meter 42. Transmission of the first signal is then terminated. A second signal at a different frequency, generally lower than the first, is then transmitted. The frequency characteristics of amplifier 25 are changed to correspond with the frequency of the second signal but the gain setting is left unchanged. The difference in attenuation of the two signals is indicated directly in percentage on meter 41. Following this measurement, the transmitter and receiver are reset for the frequency of the first signal and the receiver output checked to make sure the reference conditions are still correct. If they are not, the procedure is repeated or a suitable adjustment is made in the impedance deviation data.

The receiver to be described has provision for four different frequencies selected by a nine-section switch 45. All of the sections of the switch will not be described in detail. However, for the sake of convenience, each of the sections is designated on the drawing by the numeral 45 followed by a lower case letter $a$–$i$, and each position of the switch by a number 1 through 4, for example, 45$b$3. The components switched in the circuit are identified by the switch contact designation and the values are listed in a table at the end of the specification, for the following frequencies:

| Switch Position | Frequency (c.p.s.) |
|---|---|
| 1 | 0.1 |
| 2 | 0.3 |
| 3 | 1.0 |
| 4 | 3.0 |

A coarse gain control for the amplifier is provided by a three section 11-position switch 46 identified in a manner similar to that for the frequency switch 45. The gain control switch selects signals from resistance voltage dividers, the components of which are identified by the contact numbers. The setting of gain switch 46 indicates the minimum amplitude of the input signal necessary to achieve a selected amplitude of output signal from indicator 27. In a specific circuit, these relationships are as follows:

| Switch Position | Input Signal Amplitude (Millivolts) |
|---|---|
| 1 | 0.01 |
| 2 | .03 |
| 3 | .10 |
| 4 | .30 |
| 5 | 1.0 |
| 6 | 3.0 |
| 7 | 10.0 |
| 8 | 30.0 |
| 9 | 100.0 |
| 10 | 300.0 |
| 11 | 1000.0 |

Each stage of the amplifier-filter 25 has as its active element an operational amplifier, type PP25a, manufactured by Philbrick Researches, Inc., the frequency and gain characteristics of which are determined by the relative values of the resistors and capacitors utilized in the input, output and feedback networks for each amplifier. All of the components important to operation are identified on the drawing and their values are given in a table at the end of the specification even though many are not specifically discussed herein.

The received signal from electrodes 16 is coupled through series capacitor 50 and resistors 51, 52 to the input of amplifying element 53. Oppositely connected diodes 54 between the amplifier input and ground 55 protect the amplifier from input overvoltages. The output of the amplifier is developed across a voltage divider string forming a part of gain control switch 46a and is coupled through gain control potentiometers 45c (one for each frequency) to a fine gain control potentiometer 60. In the feedback network for amplifier 53, a series capacitor 45b shunts resistor 61. A capacitor 45a is connected from the input circuit to ground. Gain switch section 46a selects a portion of the output signal to be coupled into the feedback network. The feedback is degenerative in character so that as a greater portion of the output is fed back, a stronger signal at the input is required to establish the reference level of output.

A capacitor 62 is connected in shunt with the portion of the voltage divider string 46a which is included in the feedback network and serves to suppress undesired responses to the system at high frequencies above the upper cutoff point of the filters.

The movably tap of fine gain control potentiometer 60 connects a portion of the output signal from the first amplifier stage with the input of the bandpass amplifier filter 65.

The output of amplifier 65 is similarly developed across a series resistive voltage divider 46b connected with ground. The feedback signal is coupled from the divider through the parallel combination of resistor 68 and capacitor 45e to the amplifier. Capacitor 69 shunts the portion of resistor string 46 across which the feedback signal is developed to suppress the effect of the resistor string 46 on the high-frequency responses of the filter.

In the third stage or high-pass amplifier filter, amplifying element 74 has its feedback network connected through resistor 75 directly to the amplifier input and through capacitor 45h across resistor 76 to the input network between capacitor 45f and capacitor 45g. Capacitor 77 shunts the portion of voltage divider 46c in the feedback network, suppressing high-frequency responses as in the preceding sections.

The overall frequency response of the receiver is the same regardless of the order of the filters. However, the signal-to-noise ratio of the amplifier circuit is greatly improved by arranging the filters in the order of low pass, bandpass and high pass. By having the low-pass filter first, there is a maximum protection of the amplifier from high-frequency noise such as that at power line frequencies (commonly 50 or 60 cycles per second). The capacitor 50 provides AC coupling into the receiver, rendering it unaffected by DC contact potential on the electrodes. The low-pass filter is followed by a bandpass filter which serves to reduce even further the relative amplitude of high-frequency noise, in addition to providing a cutoff at the lower end. The third stage has a high-pass response and completes the attenuation of frequencies below that being received. As the signal amplitude increases, each of the amplifying elements 53, 65, 74 is subject to saturation. The coarse gain control settings for the amplifiers are so related that the amplifying elements will saturate in reverse order, amplifier element 74 saturating first, 65 second and 53 last.

The output of amplifier-filter 25 is essentially a sine wave at the fundamental frequency of the square wave which was received. All higher harmonics are so greatly attenuated that their effect can be neglected.

Detector 26 has two modes of operation, normal (N) and phase lock ($\phi$) selected by two-position, three-section switch 80. In the normal detection mode operational amplifier 81 and diodes 82, 83 function as a full wave rectifier, the full wave output being coupled through switch section 80c to indicator circuit 27. In the phase lock mode of operation, a pair of field effect transistors 93, 94, 2N3821, operate as choppers controlled by a signal in phase with the received signal, forming a full wave synchronous detector. Further details of generation of the synchronizing signal will be given below. In the phase lock mode, operational amplifier 81 operates as an inverter to provide one phase of the input signal to synchronous detector 93 while the incoming signal is connected directly with detector 94.

In either normal or phase lock operation, the full wave rectified signal is present at switch section 80c and is coupled to the input of filter amplifier 105, the output of which is connected with meters 41 and 42. The feedback network for operational amplifier 105 is completed through a six-position, three-section switch 106 which establishes the time constant for the amplifier. In the interest of making rapid measurement, it is desirable to keep the time constant as low as possible. However, where the received signal is varying in amplitude because of the presence of noise, it is sometimes necessary to average the signal over a long time period in order to obtain a usable indication. The table below indicates the normal settling time (approximately 4x the RC time constant of the circuit) which should be allowed for each of the positions of switch 106:

| Switch Position | Settling Time in Seconds |
|---|---|
| 1 | 2 |
| 2 | 6 |
| 3 | 15 |
| 4 | 60 |
| 5 | 150 |
| 6 | 600 |

A reference bias circuit is connected with the second input of amplifier 105. The bias source 107 includes a series current regulator 108 utilizing a field effect transistor and a shunt connected Zener voltage regulator 109. Potentiometer 110 is adjusted to apply a reference voltage of −0.8 of a volt to the amplifier input. The receiver gain is balanced when the DC component of the rectified received signal is −0.8 volt, so that the output of filter amplifier 105 is zero. When the detected signal differs from −0.8 volt, the polarity and amplitude of the amplifier output indicate this difference.

Voltmeters 41 and 42 are connected with the output of amplifier 105. The percent deviation meter 41 has three different ranges, provided by series multiplier resistors 115, 116, 117. Both meters are protected against voltage surges by shunt connected diodes and capacitors. Meter 42 is calibrated to read from zero to 200 with the center null position designated 100 and representing a balanced condition of amplifier 105. In setting up the receiver, during reception of the first or reference signal, the gain of the amplifier is initially adjusted until meter 42 reads 100. In this condition, the direct current component of the detected received signal balances with the reference signal from bias source 107. In adjusting the receiver gain, gain control potentiometer 60 is kept at its maximum position while coarse gain adjustment 46 is set to produce an output slightly greater than the 100 indication on meter 42. The gain is then reduced to the desired level by adjustment of potentiometer 60. Potentiometer 60 is blocked to prevent its being set below one-quarter of its maximum output, or some of the calculations which may be made using the gain settings would be subject to inaccuracy. Final adjustment of the gain control may be made utilizing the more sensitive meter 41 when set on its most sensitive range.

After the gain of the receiver has been adjusted, as outlined above, a signal is transmitted at the second frequency and the receiver band switch 45 changed to the new frequency without disturbing the gain setting. The percent deviation of signal amplitude is indicated directly by meter 41.

Under conditions of high noise, an improved operation can be achieved by utilizing the phase lock synchronous detector circuit. For synchronous detection, it is necessary to have a reference signal which has the same phase and frequency as the transmitted signal. In accordance with the illustrated embodiment of the invention, the reference signal is generated in the receiver and is synchronized with the received signal. Briefly, relaxation oscillator 38 is synchronized with the incoming signal and generates a series of pulses at a frequency four times that of the received signal. The output of the oscillator is coupled through a shaping circuit 120 to a diode gating network 121, which generates a series of trigger pulses for a pair of bistable multivibrators 122, 123. The output of multivibrator 122 (illustrated at the right of FIG. 5) is two square waves, one in phase with the received signal ($\phi$) and the other 180° out of phase ($\bar{\phi}$). Bistable multivibrator 123 operates in quadrature relation with the received wave and has two outputs $q$ and $\bar{q}$ 180° apart. The in-phase signal controls the operation of synchronous detector 36 while the quadrature signals provide a reference for the quadrature detector 37.

Considering the operation of the circuit in more detail, the output of high-pass amplifier 31 (FIG. 3) is connected with a pair of quadrature detectors 130, 131, field effect transistors 2N3821, with the $q$ and $\bar{q}$ signals applied to their bases. When oscillator 38 is properly synchronized with the received signal, the output of detectors 130, 131 is zero. If the oscillator is not properly synchronized, there will be signals in the detector outputs which are filtered and connected with the input operational amplifier 132. The amplifier output is a DC control signal having polarity and amplitude which represent the direction and amount of oscillator error. The control potential is connected through frequency selector switch 45$i$ with oscillator 38, which utilizes a unijunction transistor 133 connected in a relaxation oscillator circuit. The basic oscillator frequency is controlled by the values of the resistors and capacitors in the circuit and is modified by the control voltage. The general operation is known and will not be described in detail. A phase error meter 134 indicates the amplitude of the control potential. This serves to warn the operator not to make a measurement when the oscillator is improperly adjusted. When the system is badly out of synchronism, a bias potential can be applied to oscillator 38 by operation of switch 135 to aid in reaching a synchronous condition.

Figure 4:
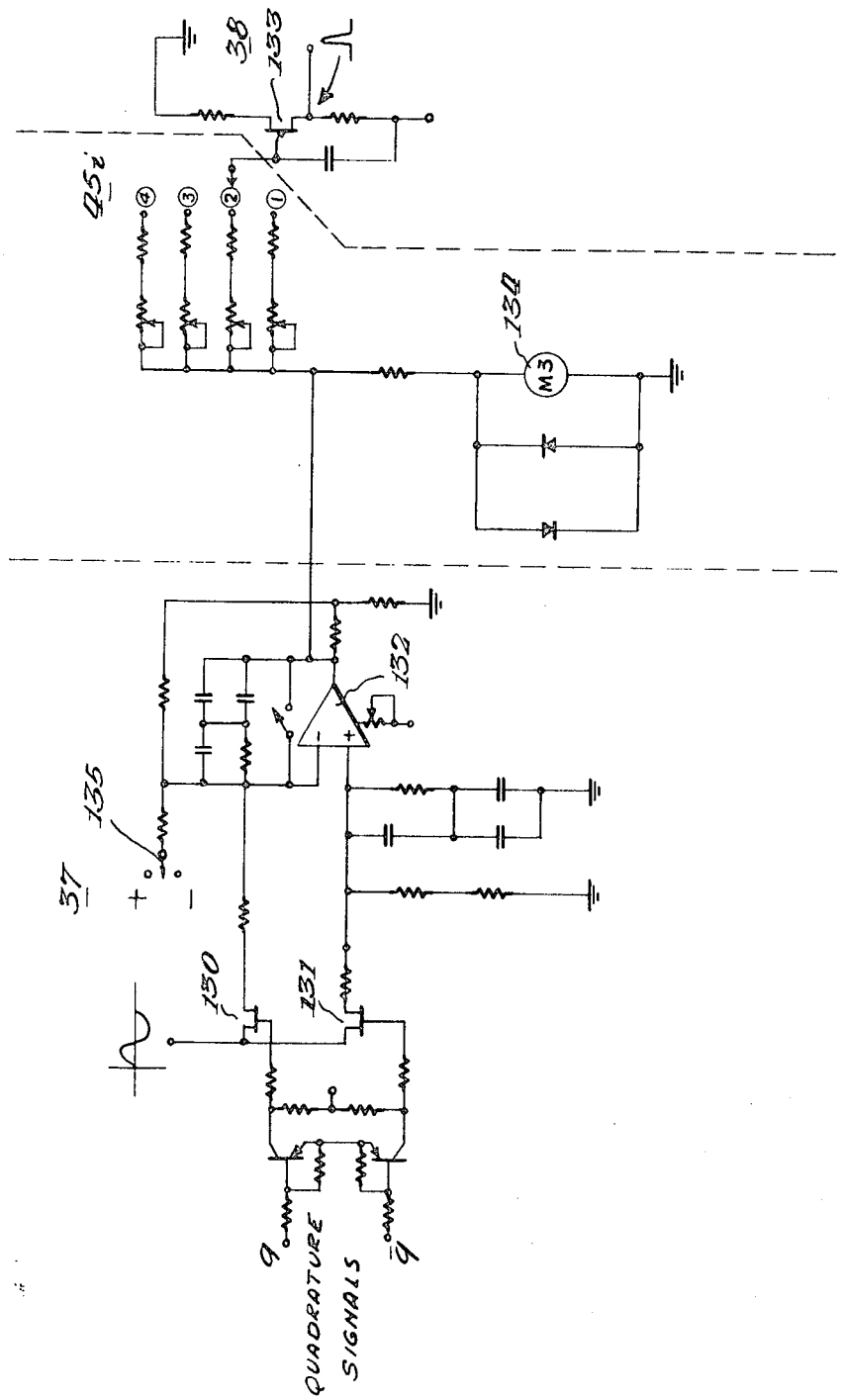
FIGS. 4 and 5 together are a schematic diagram of the local oscillator and phase lock circuitry which generates the detector control signal.
Figure 5:
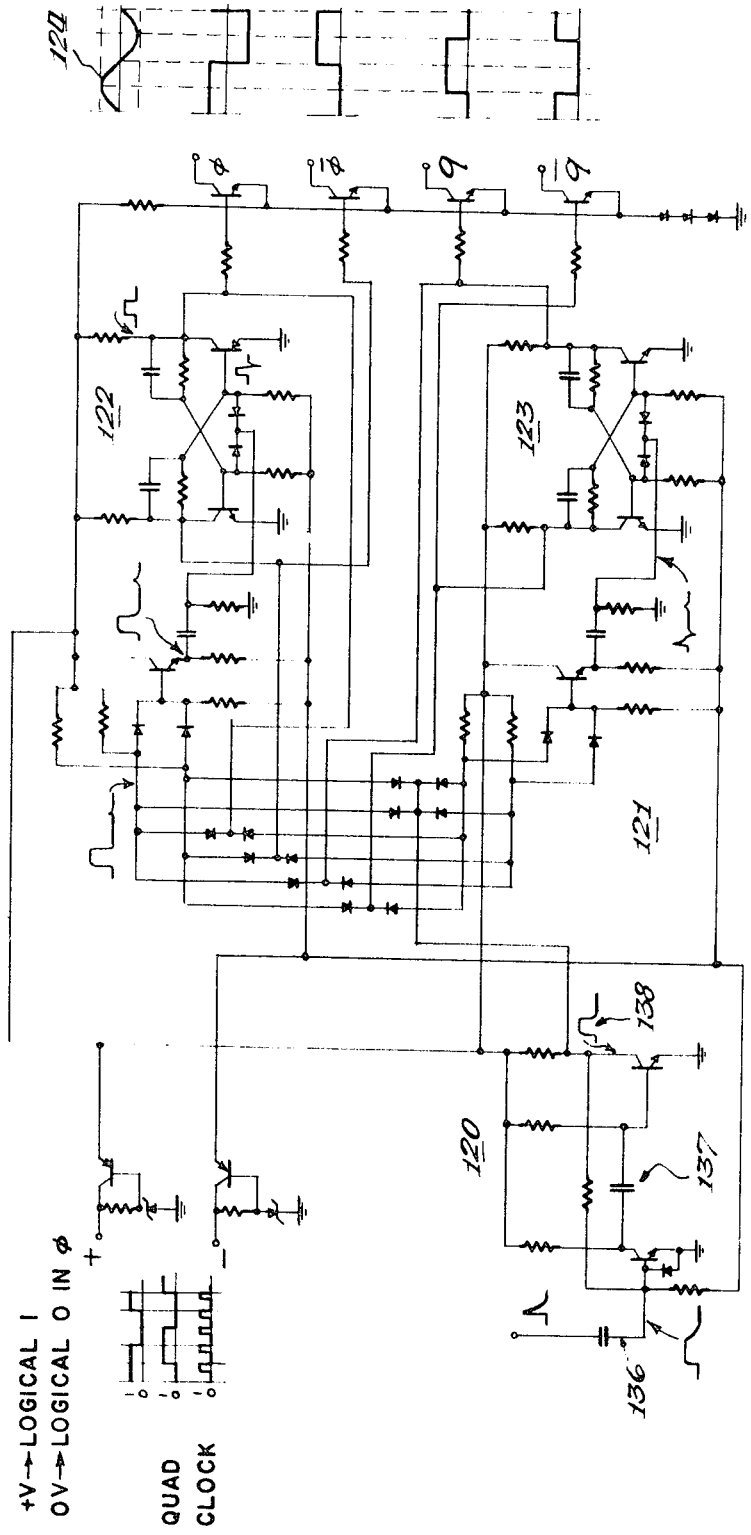

The pulse output of relaxation oscillator 38 (FIG. 4) is differentiated and connected with a monostable multivibrator 137 (FIG. 5). The output of the monostable multivibrator is a clock pulse 138 of accurately controlled amplitude and width. Gate circuit 121 is made up of a plurality of interconnected diodes which establish trigger pulses for the bistable multivibrator 122, 123, in accordance with the clock signals representing the output of synchronized oscillator 38. The trigger signal for in-phase multivibrator 22 may be represented by the logical equation $$T_c = C\phi q + C\bar{\phi}\bar{q}$$

The trigger signal for quadrature multivibrator 123 is represented by the logical equation $$T_q = C\phi\bar{q} + C\bar{\phi}q$$

where
 $T_c$ is the in-phase trigger
 $T_q$ is the quadrature trigger
 $C$ is the clock pulse
 $\phi$ is the in-phase output signal
 $q$ is the quadrature output signal.

The output of in-phase multivibrator 122 is connected through buffer amplifiers 140 with the control elements of choppers 93, 94 in the synchronous detector circuit (FIG. 3). For purposes of the present invention, it may be considered that the synchronous detector translates the amplitude of the signal frequency to a corresponding direct current. All of the noise which passes through amplifier filter 25 is also translated so that it is symmetrical about the zero frequency axis. The long time constant filter associated with the meter circuit serves as a very narrow band, high Q-filter, centered on the signal frequency and rejects noise accompanying the signal in inverse proportion to the filter Q. Use of the quadrature detector permits operation of the equipment with a signal to noise ratio of the order of one at the output of the bandpass filters. This greatly extends the utility of the equipment, permitting its operation at times and in areas where noise has prevented operation in the past.

Table of representative component values

| Reference Numeral | Description |
| --- | --- |
| 45a1 | 1.0 μf. |
| 2 | 0.33 μf. |
| 3 | 0.1 μf. |
| 4 | 0.033 μf. |
| 45b1 | 0.056 μf. |
| 2 | 0.018 μf. |
| 3 | 0.0056 μf. |
| 4 | 0.0018 μf. |
| 45c1 | 5000 Ω |
| 2 | 5000 Ω |
| 3 | 5000 Ω |
| 4 | 5000 Ω |
| 45d1 | 1.0 μf. |
| 2 | 0.33 μf. |
| 3 | 0.10 μf. |
| 4 | 0.033 μf. |
| 45e1 | 0.47 μf. |
| 2 | 0.1568 μf. |
| 3 | 0.047 μf. |
| 4 | 0.01568 μf. |
| 45f1 | 10.0 μf. |
| 2 | 3.33 μf. |
| 3 | 1.0 μf. |
| 4 | 0.33 μf. |
| 45g1 | 10.0 μf. |
| 2 | 3.33 μf. |
| 3 | 1.0 μf. |
| 4 | 0.33 μf. |
| 45h1 | 10.0 μf. |
| 2 | 3.33 μf. |
| 3 | 1.0 μf. |
| 4 | 0.33 μf. |
| 45i1 | 10K pot, 5.6 |
| 2 | 50K pot, 6.8 |
| 3 | 100K pot, 56 kΩ |
| 4 | 500K pot, 68 kΩ |
| 46a1 | 210 Ω |
| 3 | 90.9 Ω |
| 5 | 6.98 Ω |
| 10 | 2000 Ω |
| 11 | 6980 Ω |
| 46b1 | 226 Ω, .005 μf. |

| | |
|---|---|
| 3 | 107 Ω |
| 4 | 665 Ω |
| 8 | 2000 Ω |
| 9 | 6980 Ω |
| 46c2 | 412 Ω |
| 3 | 374 Ω |
| 6 | 2000 Ω |
| 7 | 6980 Ω |
| 50 | 2 μf. |
| 51 | 10 megΩ |
| 52 | 1.82 megΩ |
| 56 | 100 Ω |
| 57 | 0.001 μf. |
| 60 | 20 kΩ |
| 61 | 10 megΩ |
| 62 | 0.047 μf. |
| 46c64 | 2 megΩ |
| 66 | 100 Ω |
| 67 | 0.001 μf. |
| 68 | 2.8 megΩ |
| 69 | 0.047 μf. |
| 75 | 1.05 megΩ |
| 76 | 66.5KΩ |
| 77 | 0.047 μf. |
| 82, 83 | 1N457 |
| 84 | 18.2KΩ |
| 85 | 80.6KΩ |
| 86 | 14.3KΩ |
| 87 | 80.6KΩ |
| 88 | 80.6KΩ |
| 89 | 40.2KΩ |
| 93, 94 | 2N3821 |
| 95 | 33.2KΩ |
| 96 | 10KΩ |
| 97 | 133KΩ |
| 98 | 26.7KΩ |
| 106a1 | 0.27 μf. |
| 2 | 0.82 μf. |
| 3 | 2.0 μf. |
| 4 | 8.0 μf. |
| 5 | 20.0 μf. |
| 106c1 | 0.012 μf. |
| 2 | 0.039 μf. |
| 3 | 0.1 μf. |
| 4 | 0.39 μf. |
| 5 | 1.0 μf. |
| 108 | TIS 58 |
| 109 | 1N4565A |
| 110 | 5KΩ |
| 115 | 15.8K |
| 116 | 71.5KΩ |
| 117 | 5.76KΩ |
| 122 | 2-2N1306 |
| 123 | 2-2N1306 |
| 133 | 2N1671C |
| 137 | 2-2N1306 |
| 145 | 20 megΩ |
| 146 | 2 megΩ |
| 147 | 2 megΩ |

While we have shown and described certain embodiments of our invention, it is to be understood that it is capable of many modifications. Changes, therefore, in the arrangement and construction may be made without departing from the spirit and scope of the invention as disclosed in the appended claims.

We claim:

1. A receiver for measurement of subsurface electrical impedance utilizing a transmitted alternating signal at a subaudio frequency, subject to random noise interference, the receiver including means coupled to the earth for receiving the transmitted alternating signal to define a received signal, comprising the combination of:

filter means coupled to the earth to receive and selectively bandpass filter the transmitted alternating signal to define the received signal;

oscillator means synchronized with the fundamental frequency of the received signal;

signal-generating means coupled to the oscillator means and responsive thereto to generate quadrature and in-phase signals;

quadrature detector means coupled to the signal-generating means and responsive to the quadrature signal therefrom as well as to the received signal, and further coupled to the oscillator means to synchronize same with the received signal;

synchronous detector means including a full wave synchronous detector having two sections controlled by opposite phases of the output of the oscillator means and detecting opposite phases of the received signal, said synchronous detector means being responsive to the oscillator means via the signal-generating means to convert the amplitude of the fundamental frequency of the received signal to a corresponding direct current signal level;

amplifier-rectifier means coupled to the filter means and including means rendering the full wave synchronous detector selectively operable, said rendering means connecting said amplifier-rectifier means as an inverter to provide one phase of the received signal for the full wave synchronous detector; and indicator means responsive to said amplifier-rectifier means and said synchronous detector means for indicating the direct current signal level and thus the subsurface electrical impedance.

2. The receiver of claim 1 wherein the oscillator means defines an oscillator having a null seeking oscillator control circuit and including a source of bias and means for applying the bias to the oscillator to aid in reaching a synchronous condition.

3. The receiver of claim 2 in which said oscillator operates at four times the frequency of the received signal and the signal generating means includes in-phase and quadrature bistable multivibrators controlled by the output of the synchronized oscillator.

4. The receiver of claim 3 in which the output of the oscillator is connected with a monostable multivibrator to establish a desired pulse amplitude and duration for controlling said bistable multivibrators.

5. The receiver of claim 4 including a series of gates for triggering said bistable multivibrators in sequence to generate the in-phase and quadrature signals.

6. The receiver of claim 5 in which the bistable multivibrators are triggered in accordance with the logical equations $$T_c = C\phi q + C\bar{\phi}\bar{q}$$

and $$T_q = C\phi\bar{q} + C\bar{\phi}q$$

where
$T_c$ is an in-phase trigger
$T_q$ is a quadrature trigger
$C$ is a clock pulse from the oscillator
$\phi$ is an in-phase signal
$q$ is a quadrature signal 7. The receiver of claim 1 wherein the filter means includes plural, serially connected input amplifier stages, each comprising a frequency selective amplifier with, in sequence from input to detector, low pass, bandpass and high-pass frequency characteristics.

* * * * *